United States Patent
Foster et al.

[15] 3,635,519
[45] Jan. 18, 1972

[54] VEHICLE BODY ROOF STRUCTURE

[72] Inventors: Laverne H. Foster, Detroit; Robert M. Fox, Warren; Charles H. Webber, Royal Oak, all of Mich.

[73] Assignee: General Motors Corporation, Detroit, Mich.

[22] Filed: Aug. 12, 1970

[21] Appl. No.: 63,094

[52] U.S. Cl. ................................................296/137 R
[51] Int. Cl. ..............................................B60j 7/10
[58] Field of Search.................................296/137 R, 28

[56] References Cited

UNITED STATES PATENTS

| | | | |
|---|---|---|---|
| 2,155,147 | 4/1939 | Nelson | 296/137 R |
| 2,455,926 | 12/1948 | Gessler | 296/137 R |
| 2,937,047 | 5/1960 | Hezler | 296/137 R |
| 3,427,068 | 2/1969 | Keahn | 296/137 R |

*Primary Examiner*—Leo Friaglia
*Assistant Examiner*—Robert R. Song
*Attorney*—W. E. Finken and Herbert Furman

[57] ABSTRACT

A vehicle body roof structure includes inner and outer roof panels generally coextensive in size. The longitudinal edges of the outer panel are hem flanged over like edges of the inner panel. The lateral edges of the panels are provided with mating pinchweld flanges welded to each other. The central portion of the inner panel is located immediately adjacent a like portion of the outer panel and secured thereto by a plurality of adhesive drops. The lateral and longitudinal marginal portions bounding the central portion of the inner panel and like portions of the outer panel provide the side rail and header structures. Such marginal portions are spaced a greater distance from each other than are the central portions. The inner panel is provided with longitudinally spaced rows of laterally aligned openings for receiving listing wire mounting clips. Certain of the openings and the front lateral marginal portion are provided with outwardly embossed dams to limit flow of the uncured adhesive with respect to such openings and marginal portion during shipment of the resultant structure after assembly. The inner panel is further provided with perforations to allow for sound absorption in the space between the inner and outer panels. One or more embossed ribs may be provided in the inner panel, and a center embossment of the inner panel supports a pad of sound absorbing material in engagement with the outer panel.

7 Claims, 8 Drawing Figures

PATENTED JAN 18 1972
3,635,519
SHEET 1 OF 3
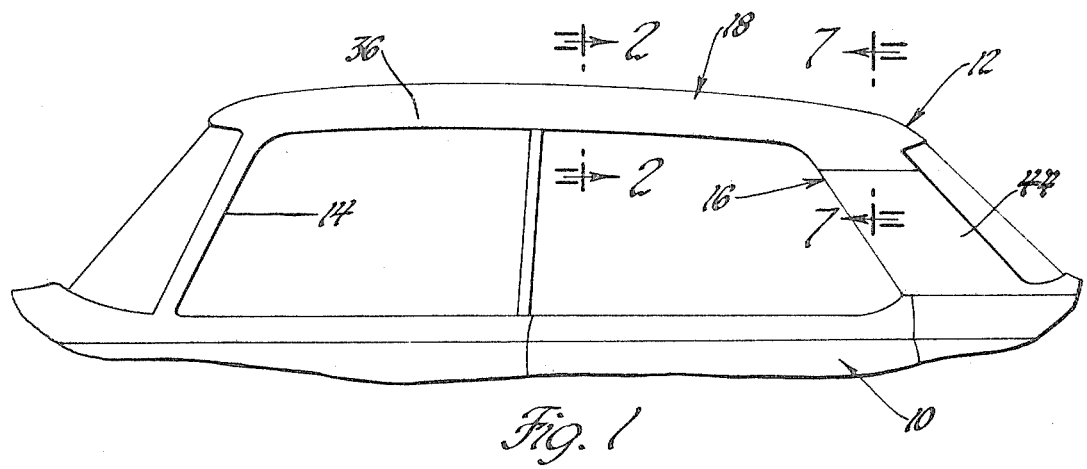
Fig. 1
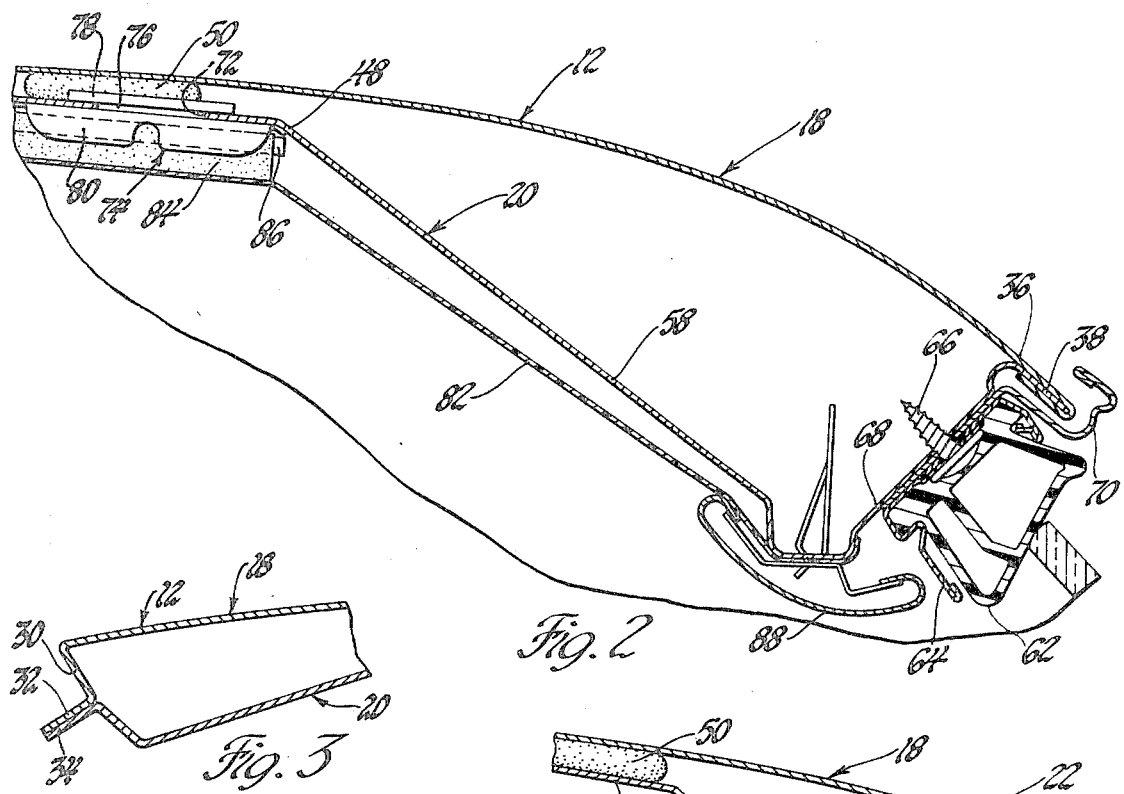
Fig. 2
Fig. 3
Fig. 4
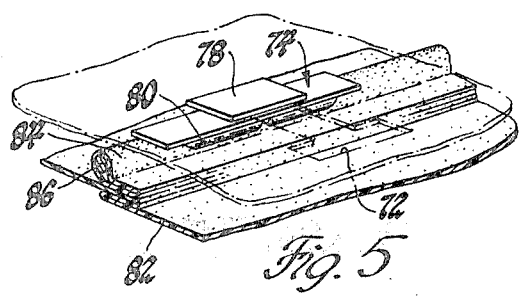
Fig. 5
INVENTORS
Laverne H. Foster,
Robert M. Fox &
BY Charles H. Webber
Herbert Furman
ATTORNEY

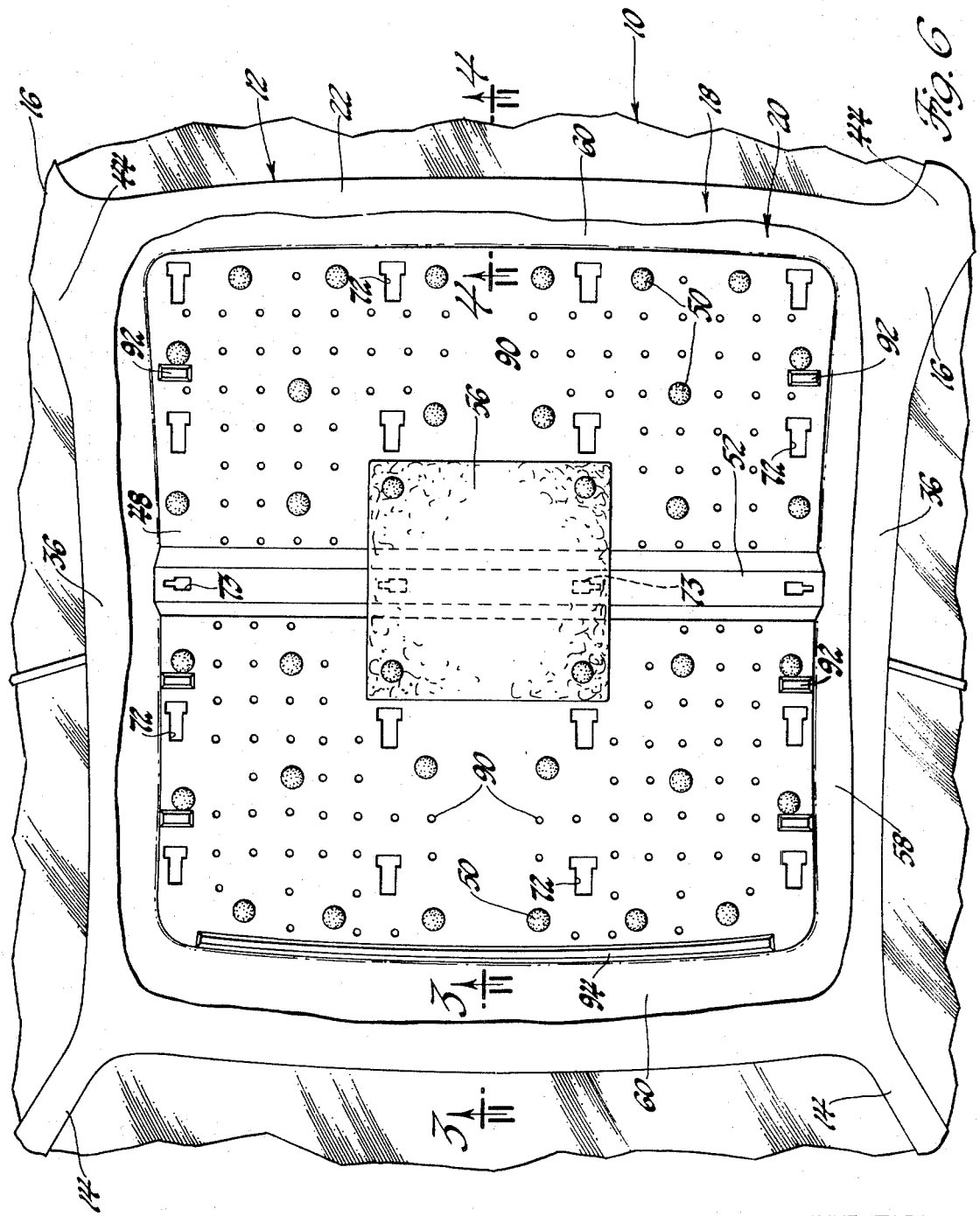

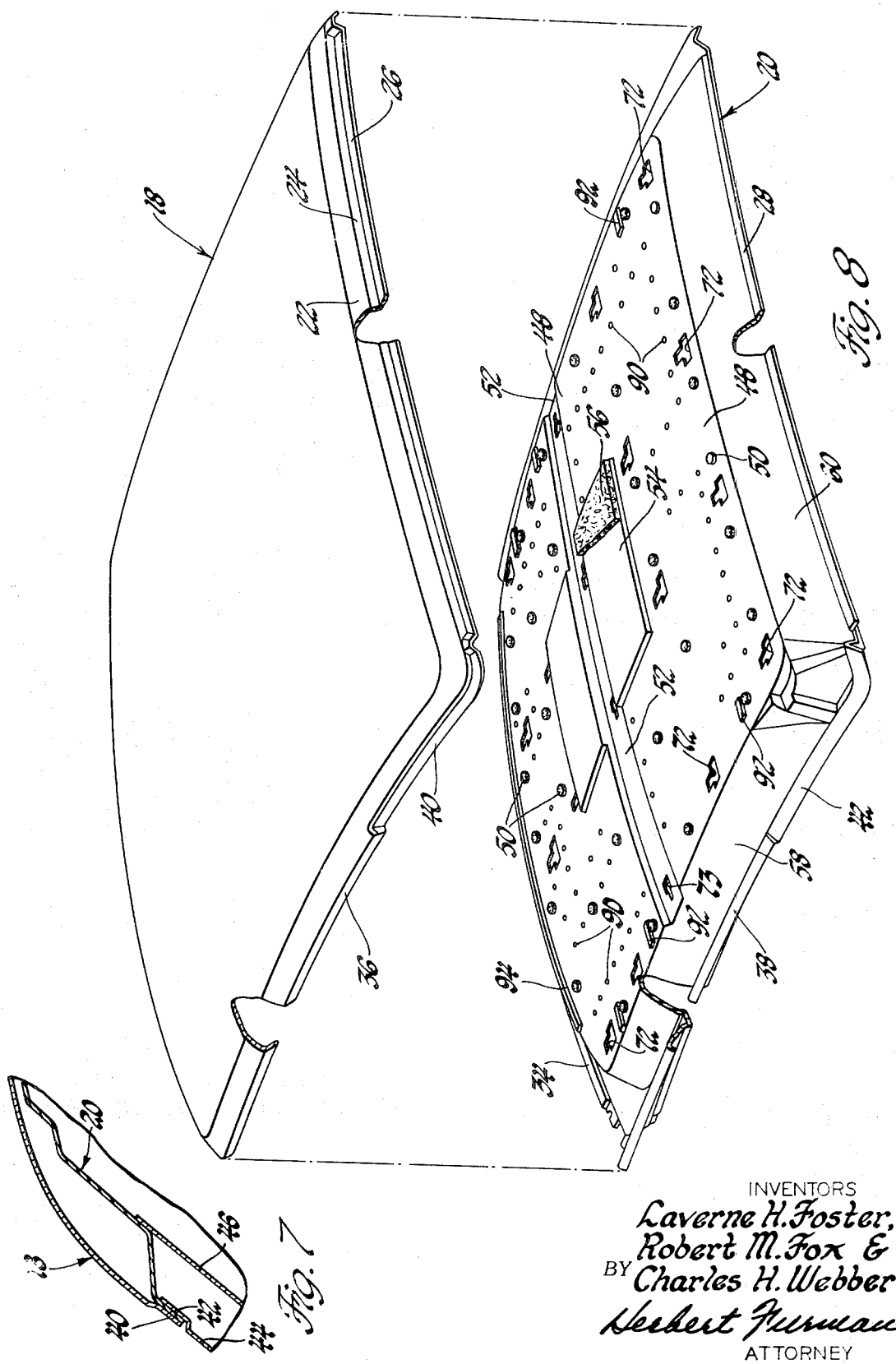

VEHICLE BODY ROOF STRUCTURE

This invention relates to vehicle body roof structures and more particularly to vehicle body roof structures of the type including inner and outer roof panels.

Vehicle body roof structures having inner and outer roof panels are known. However, the structure of this invention differs from such known structures in several respects.

The roof structure of this invention primarily includes inner and outer panels which are generally coextensive in size. The lateral edges of the panels are provided with mating pinchweld flanges secured to each other to provide portions of the windshield and backlite openings. The longitudinal edges of the panels providing the body door openings are hem flanged to each other so that no additional moldings are required to finish the body door openings. Thus the roof panel structure of this invention can be substantially completely assembled in a metal stamping or fabricating plant and then shipped for installation on a partially completed vehicle body without further manufacturing required.

The inner panel of the roof structure of this invention has its central portion located immediately adjacent a like portion of the outer panel and secured thereto by spaced adhesive drops. The central portion of the inner panel may be additionally provided with lateral and/or longitudinal integral strengthening ribs and may be provided with a center outward embossment supporting a resilient pad for engagement with the outer panel after assembly. When the drops of adhesive cure, they bond the panels to each other intermediate the secured edges thereof to provide a composite unit.

The longitudinal and lateral edge portions of the inner panel bounding the central portion are spaced a greater distance from like portions of the outer panel than the central portion of the inner panel, such edge portions cooperatively defining the roof rail and header structures of the body.

Generally the panels may be assembled to each other after being stamped by locating the resilient pad on the center embossment of the inner panel; providing the pad and the outer surface of the inner panel with the spaced drops of adhesive material; locating the outer panel over the inner panel, with the resilient pad acting as a spacer; and then securing the lateral and longitudinal edges of the panels to each other. Thus ease of fabrication is attained.

The inner panel is additionally provided with a plurality of spaced small openings so that the space between the inner and outer panels is available to function as a sound absorption chamber for the body. Additionally, the inner panel is provided with a plurality of rows of laterally aligned openings spaced longitudinally of the body which provide for installation of the clips or retainers for the listing wires.

Since the assembled roof panel structure may be shipped before the adhesive drops are cured, and it is convenient to ship the structure in a vertical position, one or more outward embossments are provided adjacent the front lateral edge portion of the inner panel and adjacent certain of the listing wire retainer openings to limit the flow of the adhesive material with respect to such edge portion and such openings before the material is cured. Such embossments act as dams.

From the foregoing it can be seen that the primary feature of the roof panel structure of this invention is that it may be fabricated as a completely assembled unit for installation on a vehicle body and, further, that the inner and outer panels of the structure function as a composite unit when they are secured to each other by both the adhesive drops and by the attachment means at the lateral and longitudinal edge portions thereof.

Referring now to the drawings:

FIG. 1 is a partial side elevational view of a vehicle body embodying a roof structure according to this invention;

FIG. 2 is an enlarged sectional view taken generally along the plane indicated by line 2—2 of FIG. 1;

FIG. 3 is a sectional view taken generally along the plane indicated by line 3—3 of FIG. 6;

FIG. 4 is a sectional view taken generally along the plane indicated by line 4—4 of FIG. 6;

FIG. 5 is a perspective view of a portion of FIG. 2;

FIG. 6 is s broken away plan view;

FIG. 7 is a sectional view taken generally along the plane indicated by line 7—7 of FIG. 1; and FIG. 8 is an exploded perspective view, partially cut away, of the inner and outer roof panels.

As shown in FIG. 1, a vehicle body designated generally 10 is provided with a roof structure 12 according to this invention.

The roof structure 12 is supported on the body by windshield pillars 14 and sail panel structures 16, the details of which form no part of this invention and are therefore not shown.

As shown in FIGS. 6 and 8, the structure 12 generally includes an outer roof panel 18 and an inner roof panel 20 which are generally coextensive in size. As shown in FIGS. 4 and 8, the rear lateral marginal or edge portion 22 of panel 18 is provided with an offset flange 24 which terminates in a lateral pinchweld flange 26. Flange 26 mates with a like flange 28 of the rear marginal or edge portion of the panel 20 and is welded thereto in a conventional manner to provide the upper edge portion of the rear window or backlite opening of the body. As shown in FIG. 3, the front lateral marginal or edge portion of the panel 18 is offset to provide a flange 30 which terminates in a lateral pinchweld flange 32 mating with a like flange 34 of the inner panel 20 and welded thereto to provide the upper edge portion of the front window or windshield opening of the body.

As best shown in FIG. 2, the longitudinal side edge portions of the panel 18 are return bent upon themselves to provide hem flanges 36 which receive and clamp the longitudinal side edge portions 38 of the inner panel 20. These longitudinal hem flange structures provide the upper edge portion of the front and rear door openings as can be seen in FIG. 1.

As shown in FIG. 7, at the sail panel areas of the body, the longitudinal side edge portions of the roof panel 18 are offset to provide pinchweld flanges 40 which mate with and are secured to like offset pinchweld flanges 42 of the inner panel 20. The outer sail panels 44 have their upper edges offset and secured to flanges 40, and the inner sail panels 46 have their upper edges secured to panel 18. The sail panels are secured to the roof structure 12 during body assembly, and the troughs or joints between panels 44 and panel 18 are finished by body solder, as can be seen in FIG. 1, so as to provide a continuation of the contour of panel 18 to the belt line in the completed or assembled body.

The central portion 48 of the panel 20 is located in immediate adjacent spaced relationship to a like portion of the panel 18 and secured thereto by a number of drops 50 of suitable adhesive material, such as vinyl plastisol-type materials. It will also be noted with reference to FIGS. 6 and 8 that the inner panel 20 is provided with a lateral inwardly embossed integral rib 52 to prevent oil canning and, further, with a center outward embossment 54 which supports a pad 56 of resilient material engaging the outer panel on assembly. The pad is secured to panel 18 by drops of the same material as the drops 50. Other lateral and/or longitudinal ribs may likewise be provided if desired.

The marginal or peripheral longitudinal and lateral edge portions 58 and 60, respectively, of the inner panel 20 are offset inwardly of the body with respect to the center portion 48 and provide the body side rails and headers in cooperation with the juxtaposed portions of the outer panel 20 as can be seen in FIGS. 2, 3, and 4. The cross-sectional shape of the edge portions 58 and 60 will vary with various body styles. However, these edge portions will be offset a greater distance from panel 18 than the central portion 20 in order to provide side rails and headers of sufficient strength.

As best shown in FIG. 2, the weatherstrips 62 for the body may be mounted in suitable channel-type housings 64 which are secured by sheet metal screws 66 to flanges 68 of the edge portions 58 of the inner panel 20. The screws 66 may also secure drip moldings 70 to the flanges 68 if such moldings are provided. Flanges 68 are continued to the belt line of the body by suitable flanges of the inner sail panels 46.

As best shown in FIGS. 6 and 8, the inner panel 20 is provided with a number of longitudinally spaced rows of laterally aligned T-shaped openings 72, and one row of laterally misaligned or random openings 73 in the basewall of rib 52. The shank portions of the openings 72 extend forwardly of the body from the laterally extending head portions. As shown in FIG. 5, the openings 72 mount the headlining retainers or clips 74 on the body. Such clips have a shank portion 76 connecting a head portion 78 with clamping portion 80. The headlining 82 conventionally includes a number of lateral sections which are sewn to each other and to pockets 84 which receive the listing wires 86. The same clips 74 are used for the openings 73 but installed differently as will be described.

The clips 74 are spaced longitudinally of each of the listing wires 86 and the clamping portions 80 of the clips grip the listing wires through the pockets 84. The clips 74 are attached to the listing wires before installation of the headlining on the body. When it is desired to install the headlining, the head portions 78 of the clips on the rearmost listing wire are inserted into the head portions of the rear row of openings 72 and then the listing wire is moved forwardly of the body so that the shank portions 76 of the clips engage the closed ends of the shank portions of the openings 72 and the head portions of the clips overlie the panel 20 to each side of the openings 72.

The next or second row of clips is then installed to install the second from the rear listing wire. The head portions 78 of the third row of clips are then inserted into the head portions of the openings 73 and the clips moved laterally of the panel 20 along the listing wire 86 until the shank portions of these clips engage the closed ends of the shank portions of the openings 73. This ensures that the shank portions of the clips on the first two listing wires are held in tight engagement with the closed ends of the shank portions of the openings 73 without requiring the installer to maintain tension on the rear half of the headlining as he installs the front half. The next two rows, the fourth and fifth rows are then installed in the same manner as the first two rows.

The front and rear edge portions of the headlining are then conventionally cemented to the edge portions 60 of the inner panel 20 and the side edge portions of the headlining are conventionally cemented and additionally secured to the edge portions 58 by clip retained garnish moldings 88 shown in FIG. 2. Thus, the headlining, the listing wires, and the clips can be preassembled and the headlining installed in the body in a very simple and expeditious manner.

It will also be noted with respect to FIGS. 6 and 8 that the inner panel 20 is provided with a number of rather small perforations or openings 90, which, in the embodiment shown, are one-fourth inch OD and are located approximately 2 inches center to center. Such openings provide for passage of sound waves into the space between the inner and outer panels when the body is completed so this space can function as a sound absorption chamber.

It will further be noted in FIGS. 6 and 8 that the inner panel 20 includes a number of outwardly extending generally rectangular embossments 92 located between certain of the adhesive drops 50 and certain of the openings 72 longitudinally of the panel 20. The reasons for such embossments will be described hereinafter.

Initially, the outer panel 18 is formed as shown in FIG. 8, with flange 36 being open. Thereafter, the inner panel 20 is likewise formed as shown in FIG. 8. After both panels are formed, the bed 56 is placed on the embossment 54 and the adhesive drops 50 are placed on the outer surfaces of the panel 20. The drops 50 are dispensed by suitable equipment and are more teardrop-shaped than are shown in FIG. 2 when initially dispensed to ensure contact with the panel 18 when the panels are subsequently assembled. The panel 18 is then dropped or placed over the panel 20. The flanges 36 of the panel 18 are then hem flanged over the flanges 38 of the panel 20 and the mating flanges 26, 28; 32, 34; and 40, 42 of the panels 18 and 20 are then welded to each other to complete the fabrication of the roof structure 12.

Due to the requirements of mass production, the roof structure 12 will be manufactured in a fabrication plant and then shipped to a body assembly plant. Preferably it will be shipped in a vertical or upright position standing on its front edge portion soon after the panels 18 and 20 have been assembled. Since the adhesive drops 50 may not be completely cured, the material of these drops could flow through certain of the openings 72 located immediately adjacent certain of the drops when the structure 12 is vertically positioned.

As shown in FIG. 6, the front marginal portion 60 of the panel 20 is provided with an elongated embossment 94 adjacent the front row of drops 50. The embossments 92 and 94 thus act as dams to limit the flow of the material of certain of the drops 50. If sufficient warehouse space and time or heat curing ovens are available in the fabrication plant, then the embossments 92 are not necessary since the drops 50 will be cured before the structure 12 is shipped in a vertical position.

Thus, this invention provides an improved vehicle body roof structure which includes spaced inner and outer roof panels cooperatively defining the roof rails and headers of the body as well as defining the upper edge portions of the front and rear window openings and the door openings, with the panels being secured to each other to function as a composite unit.

What we claim is:

1. A vehicle body roof panel assembly comprising, a roof outer panel, a roof inner panel generally coextensive with the outer panel and having the central portion thereof generally conforming to the shape of a like portion of the roof outer panel and located in adjacent spaced relationship thereto, adhesive means securing the central portions of the inner and outer panels to each other, the inner panel having outer lateral and longitudinal marginal portions bounding the central portion and spaced a greater distance from like portions of the outer panel than the spacing between the central portions of the panels, the marginal portions cooperatively providing the side rail and header structures, and means securing the longitudinal and the lateral edge portions of the marginal portions to each other to provide edge portions of vehicle body door and window openings.

2. A vehicle body roof panel assembly comprising, a roof outer panel, a roof inner panel generally coextensive with the outer panel and having the central portion thereof generally conforming to the shape of a like portion of the roof outer panel and located in adjacent spaced relationship thereto, adhesive means securing the central portions of the inner and outer panels to each other, the inner panel having outer lateral and longitudinal marginal portions bounding the central portion and spaced a greater distance from like portions of the outer panel than the spacing between the central portions of the panels, the marginal portions cooperatively defining the side rail and header structures, the spaced longitudinal edges of the roof outer panel defining the body door openings including return bent flange portions receiving the longitudinal edge portions of the inner panel, the lateral edge portions of the roof outer and inner panel cooperatively defining edge portions of body window openings and being secured to each other.

3. A vehicle body roof panel assembly comprising, a roof outer panel, a roof inner panel generally coextensive with the outer panel and having the central portion thereof generally conforming to the shape of a like portion of the roof outer panel and located in adjacent spaced relationship thereto, adhesive means securing the central portions of the inner and outer panels to each other, the inner panel having outer lateral and longitudinal marginal portions bounding the central portion and spaced a greater distance from like portions of the outer panel than the spacing between the central portions of the panels, the marginal portions cooperatively defining the side rail and header structures, portions of the spaced longitudinal edges of the roof outer panel including return bent flange portions receiving and gripping the longitudinal edge portions of the inner panel, the lateral edge portions of the roof outer and inner panel cooperatively defining body pinchweld structures and being secured to each other.

4. A vehicle body roof panel assembly comprising, a roof outer panel, a roof inner panel generally coextensive with the outer panel and having a central portion generally conforming to the shape of a like portion of the roof outer panel and including a plurality of openings therethrough, curable adhesive means securing the central portions of the inner and outer panels to each other, dam means adjacent at least certain of the openings projecting from the inner panel to adjacent the outer panel to block flow of the uncured adhesive means through the openings, the inner panel having outer longitudinal and lateral marginal portions spaced a greater distance from the outer panel than the central portion and cooperating with the outer panel to respectively provide side rail and header structures, means securing the longitudinal edge portions of the panels to each other, and means securing the lateral edge portions of the panels to each other.

5. A vehicle body roof panel assembly comprising, a roof outer panel, a roof inner panel generally coextensive with the outer panel and having a central portion generally conforming to the shape of a like portion of the roof outer panel and located in adjacent spaced relationship thereto, curable adhesive means securing the central portions of the inner and outer panels to each other, the central portion of the inner panel having a plurality of openings therethrough for transmitting sound to the chamber between the inner and outer panels and a plurality of other openings therethrough adapted to be closed by listing wire retaining means, a plurality of embossments in the inner panel adjacent certain of the other openings projecting to adjacent the outer panel to block the flow of uncured adhesive through the certain other openings prior to the closing thereof by the listing wire-retaining means, the inner panel having outer longitudinal and lateral marginal portions spaced a greater distance from the outer panel than the central portion and cooperating with the outer panel to respectively provide side rail and header structures, the major portions of the longitudinal edges of the roof outer panel defining the body door openings and including return bent flange portions receiving and securing to the longitudinal edge portions of the inner panel, the lateral edge portions of the roof outer and inner panel cooperatively defining body pinchweld structures and being secured to each other to provide body window openings.

6. The roof panel assembly recited in claim 1 wherein the chamber between the inner and outer roof panels defines a sound absorption chamber, and the inner panel includes perforations opening to the chamber to transmit sound thereto.

7. The roof panel assembly recited in claim 1 wherein the inner panel includes an elongate strengthening rib and a central embossment traversing the rib and extending toward the outer panel, a resilient pad seating on the embossment, and adhesive means securing the pad to the outer panel.

* * * * *